United States Patent
Zhao

(10) Patent No.: US 10,887,321 B2
(45) Date of Patent: Jan. 5, 2021

(54) TECHNIQUES TO VERIFY MESSAGE AUTHENTICITY

(71) Applicant: Advanced New Technologies Co., Ltd., George Town (KY)

(72) Inventor: Hang Zhao, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/722,166

(22) Filed: Dec. 20, 2019

(65) Prior Publication Data
US 2020/0137074 A1    Apr. 30, 2020

Related U.S. Application Data

(63) Continuation of application No. 16/130,510, filed on Sep. 13, 2018, which is a continuation of application No. PCT/CN2017/075066, filed on Feb. 27, 2017.

(30) Foreign Application Priority Data

Mar. 14, 2016  (CN) .......................... 2016 1 0144980

(51) Int. Cl.
*H04L 29/06* (2006.01)
*G06F 21/64* (2013.01)
(Continued)

(52) U.S. Cl.
CPC .......... *H04L 63/123* (2013.01); *G06F 21/602* (2013.01); *G06F 21/645* (2013.01);
(Continued)

(58) Field of Classification Search
None
See application file for complete search history.

(56) References Cited

U.S. PATENT DOCUMENTS

| 8,966,621 B1* | 2/2015 | Johansson ............. G06F 21/552 |
| | | 726/22 |
| 9,426,655 B2* | 8/2016 | Hong .................... H04W 12/12 |

(Continued)

FOREIGN PATENT DOCUMENTS

| CN | 1649425 | 8/2005 |
| CN | 103260140 | 8/2013 |
| CN | 105246058 | 1/2016 |

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Jeffery L Williams
(74) *Attorney, Agent, or Firm* — Fish & Richardson P.C.

(57) ABSTRACT

Techniques for verifying message authenticity is provided. In some implementations, a verification request to verify authenticity of a first message is received from a user computing device. The verification request includes a first user identifier and verification information. A delivery message record is obtained. The delivery message record includes a plurality of entries associated with one or more messages sent to one or more user computing devices. Each entry includes a user identifier and feature information of a respective message of the one or more messages. At least one entry that has a second user identifier matching the first user identifier is identified. In response to determining that the feature information of the identified at least one entry matches the verification information from the verification request, a verification message is provided to the user computing device. The verification message indicates that authenticity of the first message is verified.

20 Claims, 9 Drawing Sheets

(51) Int. Cl.
  *H04W 4/14* (2009.01)
  *G06F 21/60* (2013.01)
  *H04L 9/32* (2006.01)
  *H04L 12/58* (2006.01)

(52) U.S. Cl.
  CPC ............ *H04L 9/3236* (2013.01); *H04L 51/22* (2013.01); *H04L 63/1483* (2013.01); *H04W 4/14* (2013.01)

(56) References Cited

U.S. PATENT DOCUMENTS

| | | | |
|---|---|---|---|
| 2003/0033533 | A1 | 2/2003 | Meisel |
| 2005/0132060 | A1* | 6/2005 | Mo ............... H04L 51/12 709/227 |
| 2005/0170812 | A1 | 8/2005 | Kim |
| 2012/0172067 | A1 | 7/2012 | Gillin |
| 2014/0007196 | A1 | 1/2014 | Lin |
| 2014/0181933 | A1* | 6/2014 | Sanjeev ............ H04L 63/0823 726/7 |
| 2014/0215571 | A1* | 7/2014 | Shuster ............ H04L 63/1483 726/4 |
| 2014/0300490 | A1 | 10/2014 | Kotz et al. |
| 2014/0380052 | A1 | 12/2014 | Tao et al. |
| 2016/0021534 | A1* | 1/2016 | Hong ............... H04W 12/12 455/411 |
| 2016/0044028 | A1* | 2/2016 | Cha ............... H04L 51/12 726/4 |
| 2019/0014127 | A1* | 1/2019 | Zhao ............... H04W 4/14 |

OTHER PUBLICATIONS

European Extended Search Report in European Patent Application No. 17765703.8, dated Sep. 4, 2019, 10 pages.
International Preliminary Report on Patentability in International Application No. PCT/CN2017/075066 on Sep. 18, 2018; 8 pages.
International Search Report by the International Searching Authority issued in International Application No. PCT/CN2017/075066 dated Apr. 28, 2017; 8 pages.
Nakamoto, "Bitcoin: A Peer-to-Peer Electronic Cash System," www.bitcoin.org, 2005, 9 pages.

\* cited by examiner

TECHNIQUES TO VERIFY MESSAGE AUTHENTICITY

CROSS-REFERENCE TO RELATED APPLICATIONS

This application is a continuation of U.S. patent application Ser. No. 16/130,510, filed on Sep. 13, 2018, which is a continuation of PCT Application No. PCT/CN2017/075066, filed on Feb. 27, 2017, which claims priority to Chinese Patent Application No. 201610144980.1, filed on Mar. 14, 2016, and each application is hereby incorporated by reference in its entirety.

TECHNICAL FIELD

The present application relates to the field of network communications technologies, and in particular, to a message anti-forgery implementation method and device.

BACKGROUND

With the development of communications technologies and the popularization of intelligent terminal devices, the Internet economy is growing rapidly. Networks bring convenience and efficiency to users, but also pose a threat to security due to open propagation approaches.

One method commonly used by a malicious user is sending fraud text messages to users by simulating special service phone numbers of legal subjects, such as a financial institution, a shopping platform, or a mobile carrier; or by using similar phone numbers easily confused with the special service phone numbers; or registering a relatively official name with an instant messaging system to send fraud messages to users; or sending fraud e-mails to users by pretending to be official e-mail addresses. The malicious users defraud the users of their accounts and passwords and ask the users for remittance and etc., by using these fake messages.

In the existing technology, users can determine whether the messages are true by identifying a message sender or by checking whether a link address in message content is correct. The probability of being cheated can be reduced when the users correctly remember a link address of a legal website and a phone number or name used by the legal subject to send messages. Consequently, the users' burden increases. For the message sent by simulating the legal subject, the users are often unable to identify authenticity of the message, and losses can be easily taken by the users.

SUMMARY

The present application provides a message anti-forgery implementation method, applied to a verification server. The verification server can obtain a delivery message record, the delivery message record includes receiver user identifiers and feature information of some delivery messages, and the method includes the following: receiving a message verification request uploaded by a terminal device, where the message verification request includes a receiver user identifier and verification information of a message to be verified; and returning a "verification succeeds" response to the terminal device, when the delivery message record has a delivery message that has the same receiver user identifier as the message to be verified and whose feature information matches the verification information of the message to be verified.

A message anti-forgery implementation method provided in the present application is applied to a message server, including: generating a delivery message, and sending the delivery message based on a receiver user identifier; and writing the receiver user identifier and feature information of the delivery message into a delivery message record, so that a verification server matches the receiver user identifier and the feature information of the delivery message with a receiver user identifier and verification information of a message to be verified, to determine whether the message to be verified is verified.

A message anti-forgery implementation method provided in the present application is applied to a terminal device, including: uploading a message verification request to a verification server based on a user operation, where the message verification request includes a receiver user identifier and verification information of a message to be verified, so that the verification server matches the receiver user identifier and the verification information of the message to be verified with a receiver user identifier and feature information of a delivery message in a delivery message record, to determine whether the message to be verified is verified; and receiving a message verification response that includes a verification result and is returned by the verification server, and displaying the verification result to a user.

The present application further provides a message anti-forgery implementation device, applied to a verification server, where the verification server can obtain a delivery message record, the delivery message record includes receiver user identifiers and feature information of some delivery messages, and the device includes a verification request receiving unit, configured to receive a message verification request uploaded by a terminal device, where the message verification request includes a receiver user identifier and verification information of a message to be verified; and a verification request matching unit, configured to return a "verification succeeds" response to the terminal device, when the delivery message record has a delivery message that has the same receiver user identifier as the message to be verified and whose feature information matches the verification information of the message to be verified.

A message anti-forgery implementation device provided in the present application is applied to a message server, including: a delivery message generation unit, configured to generate a delivery message, and send the delivery message based on a receiver user identifier; and a feature information recording unit, configured to write the receiver user identifier and feature information of the delivery message into a delivery message record, so that a verification server matches the receiver user identifier and the feature information of the delivery message with a receiver user identifier and verification information of a message to be verified, to determine whether the message to be verified is verified.

A message anti-forgery implementation device provided in the present application is applied to a terminal device, including: a verification request uploading unit, configured to upload a message verification request to a verification server based on a user operation, where the message verification request includes a receiver user identifier and verification information of a message to be verified, so that the verification server matches the receiver user identifier and the verification information of the message to be verified with a receiver user identifier and feature information of a delivery message in a delivery message record, to determine whether the message to be verified is verified; and a verification response receiving unit, configured to receive a message verification response that includes a verification result and is returned by the verification server, and display the verification result to a user.

It can be seen from the above technical solutions that, in the implementations of the present application, the message server that sends the message to the user records the receiver user identifier and the feature information of the delivery message. After the terminal device uploads the receiver user identifier and the feature information of the message to be verified to the verification server, the verification server checks whether there is a delivery message that matches the message to be verified, to determine whether the message to be verified is verified. The implementations of the present application provide the user with a mechanism for verifying the authenticity of the received message. As such, a fake message sent by a subject pretending to be real can be identified, and the network security of the user can be improved.

DESCRIPTION OF IMPLEMENTATIONS

The implementations of the present application provide a message anti-forgery implementation method. When the user doubts the authenticity of a received message, the user can send a message verification request that includes related information of a message to be verified to a verification server. Related information of a delivery message sent to a user is recorded on a network side. The verification server verifies the user's message to be verified based on the recorded related information of the delivery message to determine whether the message to be verified is true, so that the user can use the verification server to identify a fake message without relying on experience. The user's burden can be reduced while better security is provided for the user. As such, the problem in the existing technology can be resolved.

Figure 1:
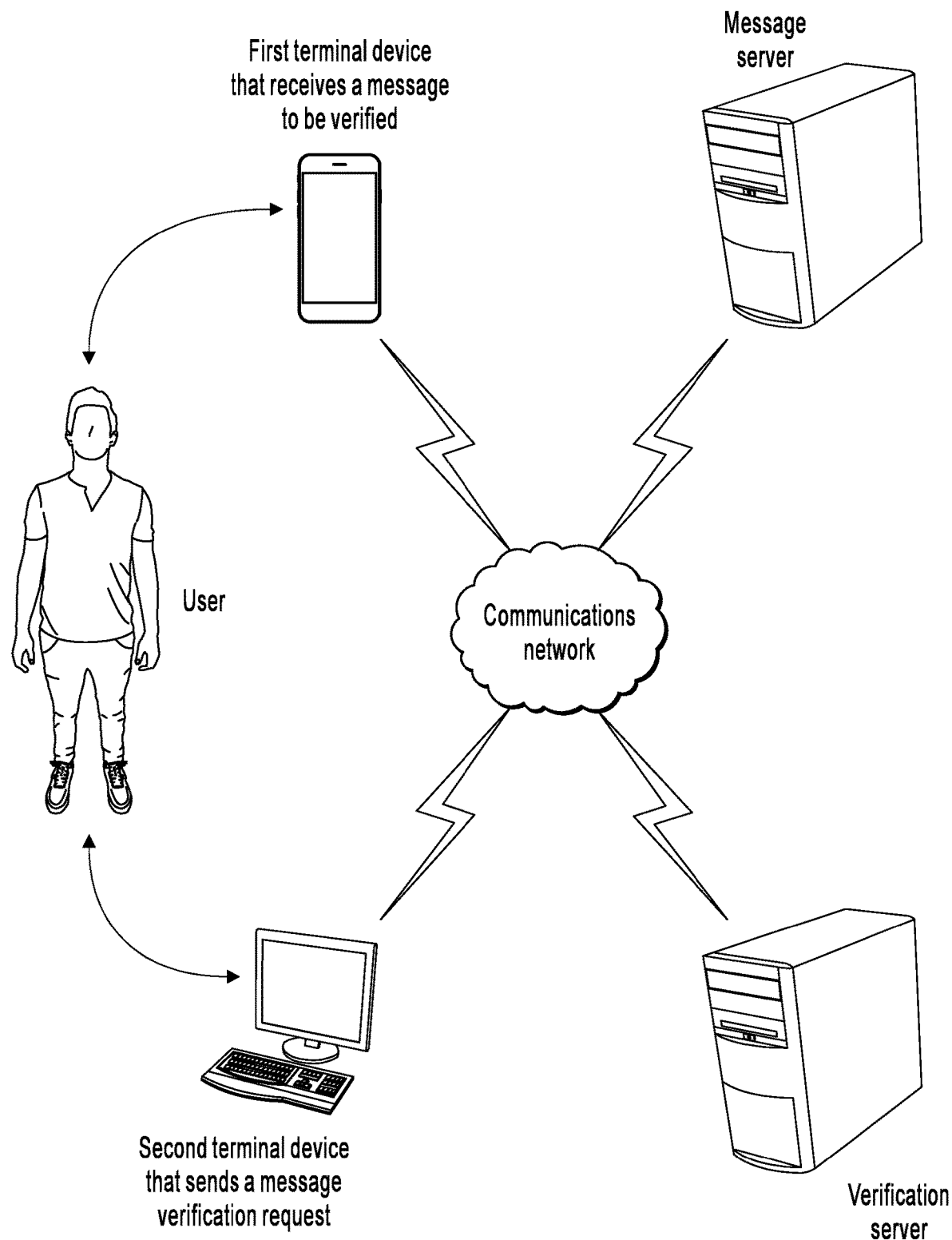
FIG. 1 is a structural diagram illustrating a network in an application scenario, according to an implementation of the present application.

An example network environment that an implementation of the present application is applied to is shown in FIG. 1. A message server is responsible for sending a message to a user. A verification server is responsible for responding to a request of a terminal device for verifying a message to be verified. After a first terminal device of the user receives the message to be verified, the user can use a second terminal device to initiate a request for verifying the message to be verified to the verification server. The message server and the verification server can be the same server, and the first terminal device and the second terminal device can be the same terminal device.

The message server, the verification server, the first terminal device, or the second terminal device can access each other by using a network. The first terminal device or the second terminal device can be a device such as a mobile phone, a tablet computer, a personal computer (PC), or a notebook computer. The message server or the verification server can be a physical or logical server, or can be two or more physical or logical servers that have different responsibilities and cooperate with each other to implement various functions of the message server or the verification server in the implementation of the present application. The type of the first terminal device, the second terminal device, the message server, or the verification server, and a type, a protocol and such of a communications network among the first terminal device, the second terminal device, the message server, and the verification server are not limited in the implementation of the present application.

Figure 2:
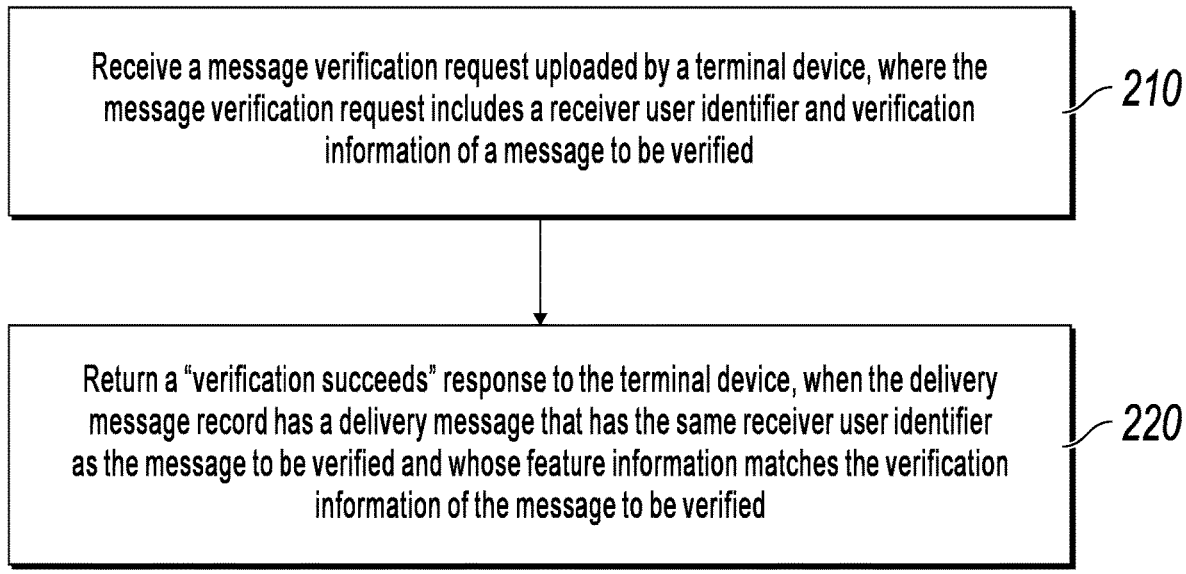
FIG. 2 is a flowchart illustrating a message anti-forgery implementation method applied to a verification server, according to an implementation of the present application.
Figure 3:
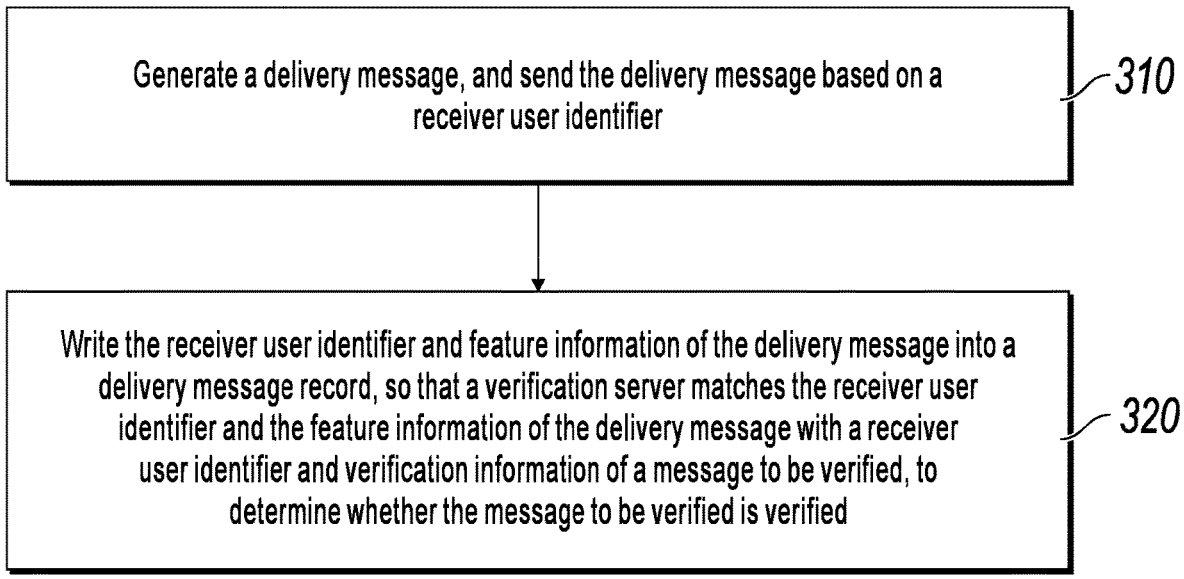
FIG. 3 is a flowchart illustrating a message anti-forgery implementation method applied to a message server, according to an implementation of the present application.
Figure 4:
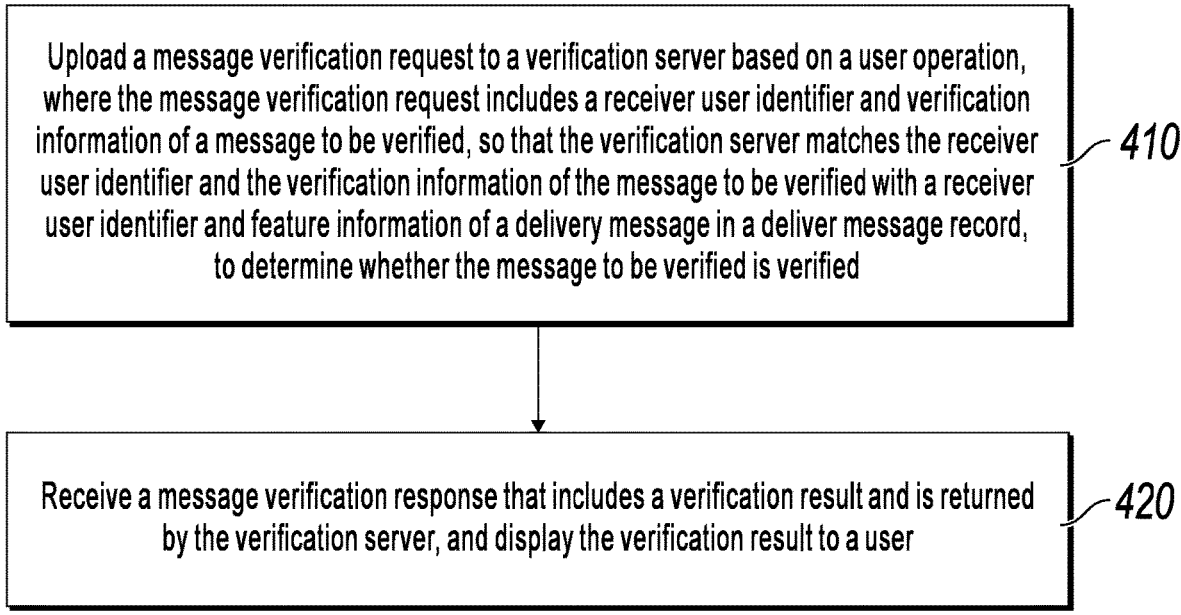
FIG. 4 is a flowchart illustrating a message anti-forgery implementation method applied to a terminal device, according to an implementation of the present application.

In an implementation of the present application, a procedure for applying a message anti-forgery implementation method to a verification server is shown in FIG. 2, a procedure for applying a message anti-forgery implementation method to a message server is shown in FIG. 3, and a procedure for applying a message anti-forgery implementation method to a terminal device is shown in FIG. 4.

Step 310: A message server generates a delivery message, and sends the generated delivery message based on a receiver user identifier.

The message in the implementation of the present application can be any form of information that can be sent by the message server to a terminal device, for example, a short message, an e-mail, an instant message, and a message sent to a client application installed on the terminal device. The message server can generate a message in the previous form or another form based on the existing technology. Details are omitted here for simplicity. Correspondingly, the receiver user identifier of the delivery message can be a mobile device identifier of a user (such as a mobile phone number or a mobile subscriber international identifier), an e-mail address, a user name in an instant messaging system, a login account of the user in an application system, etc.

During generation of the delivery message, additional information used for message verification can be generated, and the additional information can be added to a complete message body of the delivery message and sent to the user. For example, the message server can generate an anti-forgery code for each delivery message based on an algorithm. A combination of the anti-forgery code and the receiver user identifier uniquely corresponds to one delivery message. The message server encapsulates the anti-forgery code in the corresponding delivery message and sends the delivery message. The algorithm for generating the anti-forgery code can be implemented with reference to various methods for generating duplicate-free random codes in the existing technology. Details are omitted here for simplicity.

Step 320: The message server writes the receiver user identifier and feature information of the delivery message into a delivery message record, so that a verification server matches the receiver user identifier and the feature information of the delivery message with a receiver user identifier and verification information of a message to be verified, to determine whether the message to be verified is verified.

After sending the delivery message, the message server writes the receiver user identifier of the delivery message and the feature information of the delivery message into the delivery message record. The message server can store the delivery message record locally, can store the delivery message record in any storage location that can be accessed by the message server and the verification server in a network, or can send the delivery message record and an update to the delivery message record to the verification server and the verification server stores the delivery message record and the update to the delivery message record.

In various types of information associated with the delivery message, any information related to the message received by the user terminal device and mapping information generated based on the information by using an algorithm can be used as the feature information of the delivery message. For example, a sending time for the delivery message, message content, a hash value of the sending time, and a hash value of the message content can be used as the feature information of the delivery message. In addition, the additional information used for message verification can be used as the feature information of the delivery message, for example, an anti-forgery code generated for each delivery message.

In different application scenarios, composition of the feature information of the delivery message can be determined based on factors such as actual needs of the scenarios and a form of the delivery message. Implementations are not limited in the present application. In an implementation, a content feature value generated based on the message content of the delivery message by using a predetermined algorithm can be used as all or a part of the feature information. The content feature value is usually calculated on the message server. For example, the message server can input the message content and the receiver user identifier of the delivery message into a predetermined digest algorithm, calculate a content digest, and use the content digest as the content feature value of the delivery message.

Step 410: A terminal device uploads a message verification request to the verification server based on a user operation. The message verification request includes a receiver user identifier and verification information of a message to be verified, so that the verification server matches the receiver user identifier and the verification information of the message to be verified with the receiver user identifier and the feature information of the delivery message in the delivery message record, to determine whether the message to be verified is verified.

Step 210: The verification server receives the message verification request uploaded by the terminal device, where the message verification request includes a receiver user identifier and verification information of a message to be verified.

After receiving a message, if the user doubts the authenticity of the message, the user can use the received message as a message to be verified, and instruct, by using a predetermined operation, the terminal device to initiate a message verification request to the verification server. The terminal device extracts the verification information of the message to be verified from related information of the message to be verified, encapsulates the user identifier and the verification information used for receiving the message to be verified in the message verification request, and sends the message verification request to the verification server.

Because the verification information submitted by the terminal device is to be used by the verification server to match the feature information of the delivery message, related information of the message to be verified that is used as the verification information is usually determined by using a method for determining the feature information of the delivery message.

It is worthwhile to note that in the implementation of the present application, the user can initiate a request to the verification server on the terminal device that receives the message to be verified, or can initiate a request on another terminal device of the same type or a different type from the terminal device that receives the message to be verified. When the user initiates a request on another terminal device which is different from the terminal device that receives the message to be verified, usually, the terminal device that initiates the request needs to obtain the receiver user identifier and/or the verification information of the message to be verified under the intervention of the user. The receiver user identifier and/or the verification information of the message to be verified can be manually obtained by the user based on hardware and software types of the two terminal devices, a form of the message to be verified, etc., or can be obtained by the user with reference to the existing technology. Details are omitted here for simplicity.

Step 220: The verification server returns a "verification succeeds" response to the terminal device, when the delivery message record has a delivery message that has the same receiver user identifier as the message to be verified and whose feature information matches the verification information of the message to be verified.

Step 420: The terminal device receives a message verification response that includes a verification result and is returned by the verification server, and displays the verification result to a user.

The verification server obtains the delivery message record by using a method that corresponds to a method used by the message server to process the delivery message record, or matches the message to be verified with a record entry (that is, each delivery message) in the delivery message record. For example, the verification server can request the delivery message record from the message server, or can read the delivery message record maintained by the message server from a predetermined storage location in the network. Alternatively, the message server can send the delivery message record and the update to the delivery message record to the verification server, and the verification server can read the delivery message record stored on the verification server.

After receiving the message verification request submitted by the terminal device, the verification server extracts the receiver user identifier and the verification information of the message to be verified from the message verification request, searches the delivery message record for a delivery message that has the same receiver user identifier, and matches feature information of the identified delivery message with the verification information of the message to be verified. If there is a delivery message that can match the message to be verified, the message to be verified is sent by the message server and the message to be verified is verified. The verification server uses "verification succeeds" as the verification result and returns the message verification response to the terminal device. If there is no delivery message that has the same receiver user identifier in the delivery message record, or if there is no delivery message that matches the verification information of the message to be verified in the delivery message that has the same receiver user identifier, the message to be verified cannot be verified. The verification server uses "verification fails" as the verification result and returns the message verification response to the terminal device.

After receiving the message verification response that includes the verification result and is returned by the verification server, the terminal device displays the result of "verification succeeds" or "verification fails" to the user.

The degree of matching processing and message verification performed by the verification server varies when content included in the feature information of the delivery message is different from content included in the corresponding verification information of the message to be verified. The following describes several possible methods for selecting the feature information and the verification information and corresponding matching processing processes by using examples.

In a first method, the message content of the delivery message can be used as the feature information, and correspondingly, the message content of the message to be verified is used as the verification information. The verification server compares the message content of the message to be verified with message content of a delivery message that has the same receiver user identifier. The message to be verified is verified if content of a delivery message is consistent with the content of the message to be verified. In this method, authenticity of the message can be verified very accurately, but the delivery message record that needs to be stored is often very large. As such, high storage pressure is caused to a server and the speed of querying and matching records is affected.

In a second method, the message server can compress the message content of the delivery message into a content feature value (such as a hash value or a content digest) of the delivery message by using a predetermined algorithm, and use the content feature value as the feature information. Correspondingly, the terminal device can generate a content feature value of the message to be verified based on the message content of the message to be verified by using the same predetermined algorithm, use the content feature value as the verification information, and uploads the verification information to the verification server. Alternatively, the terminal device can use the message content of the message to be verified as the verification information and upload the verification information. The verification server generates a content feature value of the message to be verified based on the message content of the message to be verified by using the same predetermined algorithm, and compares the content feature value with a content feature value of a delivery message that has the same receiver user identifier. Verification succeeds if a content feature value of a delivery message is the same as the content feature value of the message to be verified. Compared with the first method, the second method has slightly lower verification accuracy, but can greatly reduce a data volume in the delivery message record and improve the response speed of the verification server.

In a third method, an anti-forgery code generated by the message server can be used as the feature information of the delivery message. The message server generates an anti-forgery code for each delivery message, and sends the anti-forgery code and the message content to the user, as parts of a complete message body. A combination of the anti-forgery code and the receiver user identifier is in a one-to-one mapping relationship with the delivery message. The terminal device uses an anti-forgery code of the message to be verified as the verification information and uploads the verification information to the verification server. The verification server compares the anti-forgery code of the message to be verified with an anti-forgery code of a delivery message that has the same receiver user identifier. Verification succeeds if an anti-forgery code of a delivery message is the same as the anti-forgery code of the message to be verified. This method can verify whether the message server sends a message that includes the anti-forgery code to the user, but cannot determine that message content is correct. If the message sent by the message server is intercepted by a malicious user, the message content is modified but the anti-forgery code is not modified, and then the modified message is sent to the user. As such, a message verification result is incorrect.

In a fourth method, the content feature value in the second method and the anti-forgery code in the third method can be together used as the feature information of the delivery message. Correspondingly, the terminal device uses the content feature value or the message content (which is used by the verification server to generate the content feature value of the message to be verified) of the message to be verified and the anti-forgery code included in the message to be verified as the verification information and uploads the verification information to the verification server. The verification server compares the anti-forgery code and the content feature value of the message to be verified with an anti-forgery code and a content feature value of a delivery message that has the same receiver user identifier. Verification succeeds if both an anti-forgery code and a content feature value of a delivery message are the same as the anti-forgery code and the content feature value of the message to be verified. In this method, a data volume in the delivery message record can be reduced, the response speed of the verification server can be improved, and the verification accuracy can be improved.

The verification information is usually included in a complete message body of the message to be verified. Therefore, to reduce processing performed by the user or the terminal device on the message to be verified, the terminal device can encapsulate the complete message body of the message to be verified in the message verification request. After receiving the message verification request, the verification server extracts the complete message body of the message to be verified from the message verification request, and parses the complete message body to obtain the verification information of the message to be verified.

The verification server can disassemble the complete message body of the message to be verified into parts based on a format of the delivery message, to obtain verification information used as a part. For example, the user receives, on a mobile phone, a billing message sent by a third-party payment platform. A complete message body is "The bill of your account 000**0000 in September is 100 Yuan, and will be automatically repaid on October 10, or you can go to m.zhifu.com/J/thaUu to repay it immediately. Anti-forgery code: qaz. [a third-party platform name]". Based on a format used by the third-party payment platform to send the billing message, the verification server can parse the complete message body to obtain message content ("A bill of your account 000**0000 in September is 100 Yuan, and will be automatically repaid on October 10, or you can go to m.zhifu.com/J/thaUu to repay it immediately"), the anti-forgery code ("qaz"), and a sender signature ("the third-party platform name"). The message content and the anti-forgery code are used as the verification information of the message to be verified in the fourth implementation.

In the implementation of the present application, the message server and the verification server can be the same server. Alternatively, the verification server can verify delivery messages from one or more message servers. The message servers can send messages to the user by using the same channel or different channels. In other words, a server that sends a message can verify the message sent by the server or a message sent by illegally using an identity of the server. Alternatively, the verification server can verify messages sent by some message servers on a channel or messages sent by illegally using the message servers. Alternatively, the verification server can verify messages sent by a plurality of message servers on a plurality of channels or messages sent by illegally using the message servers. A channel used by a message server corresponds to a combination of message forms in an application system. For example, a short message from a third-party payment platform corresponds to a channel, an instant message from the third-party payment platform corresponds to another channel, and a client application (App) push message from the third-party payment platform corresponds to a third channel.

Receiver user identifiers of different channels in a plurality of channels may be the same when the verification server provides a message verification service for a plurality of message servers on the channels. To avoid confusion between messages in the delivery message record that are sent to the same user by using different channels, the message server can also write information of a delivering channel for the delivery message into the delivery message record. The terminal device obtains information of a receiving channel (which can be entered by the user, or can be obtained through automatic identification by using a process of receiving the message to be verified) for the message to be verified, encapsulates the receiving channel information in the message verification request, and sends the message verification request to the verification server. The verification server compares the verification information of the message to be verified with feature information of a delivery message that has the same receiver user identifier and whose the delivering channel and the receiving channel are the same. Verification succeeds if a delivery message matches the message to be verified.

In addition, it is worthwhile to note that, in some implementations of the present application, various messages sent by the message server to the user do not include an address link or another access method of the verification server to prevent a malicious user from setting a fake verification server to verify a message sent by the malicious user by illegally using a legal subject. A verification server accessing method can be provided for the user on an official website or an official micro blog, or can be provided for the user by using another publicity method.

It can be seen that, in the implementation of the present application, the message server records the receiver user identifier and the feature information of the delivery message. When the user doubts the received message, the user can send the message verification request that includes the receiver user identifier and the verification information of the message to be verified to the verification server, and the verification server determines whether the message to be verified is true based on the delivery message record. The technical solution of the present application provides the user with a mechanism for determining whether the received message is sent by a legal subject. As such, the user does not need to rely on subjective experience to perform determining, so that the user's burden is reduced while the user security is improved.

In an application example of the present application, a third-party payment platform sends messages to the user by using a plurality of channels. The channels and official service interfaces of the third-party payment platform include a special service phone number for a short message, an official e-mail address, an official account of an instant messaging system, and an official account of an office service system. Correspondingly, user identifiers of the channels are respectively a user's mobile phone number, a registered e-mail address of the user on the third-party payment platform, a user name of the user in the instant messaging system, and a user name of the user in the office service system.

The channels have their respective message servers. Each message server allocates a sequence number of a message to be sent by the server to the user. The sequence number is used as a message ID (identity). Before sending the message to the user, the message server inputs the message ID of the message to be sent and a current time into a predetermined hash algorithm, and uses the last four digits of an obtained hash value as an anti-forgery code of the delivery message. The message server searches a delivery message record table to determine whether an entry (that is, another delivery message that has been sent to the same user) that has the same receiver user identifier of the delivery message has the same anti-forgery code. If yes, a new anti-forgery code is generated until the anti-forgery code is different from the anti-forgery code of the entry that has the same receiver user identifier.

The message server adds the anti-forgery code after message content, generates the delivery message, and sends the message based on a user identifier of the channel. The message server uses the message content and the receiver user identifier of the delivery message as input, generates a content digest by using a predetermined digest algorithm, and uses the content digest and the anti-forgery code as feature information of the delivery message.

The message server adds an entry corresponding to the delivery message to the delivery message record table. The delivery message record table is stored in a predetermined network location. A structure of the delivery message record table is shown in Table 1.

TABLE 1

| Index number | Receiver user identifier | Anti-forgery code | Content digest | Sending time |
|---|---|---|---|---|
| 1 | | | | |
| 2 | | | | |

In Table 1, the sending time is a time when the message server sends the delivery message.

The official service interfaces of the third-party payment platform are also used as ingresses used by the user to access the verification server. When receiving a message that seems to be sent by the third-party payment platform, the user can instruct the terminal device to encapsulate a complete message body of the message to be verified, a channel for receiving the message to be verified, and a receiver user identifier in a message verification request, and send the message verification request to any one of the official service interfaces. The user can use the channel for receiving the message to be verified to verify the message to be verified, and can also use another channel to verify authenticity of the message.

The verification server extracts the complete message body, the receiving channel, and the receiver user identifier of the message to be verified from the message verification request received through each official service interface. The verification server parses the complete message body of the message to be verified based on a format of the delivery message from the message server of the third-party platform (different delivery channels can correspond to the same or different message formats), to obtain message content and an anti-forgery code of the message to be verified. The verification server uses the message content and the receiver user identifier of the message to be verified as input, generates a content digest of the message to be verified by using the same predetermined digest algorithm as the predetermined digest algorithm used by the message server, and uses the content digest and the anti-forgery code as verification information of the message to be verified.

The verification server obtains the delivery message record table stored in the predetermined network location by the message server that corresponds to the channel for receiving the message to be verified, and searches the delivery message record table to determine whether there is an entry that has the same receiver user identifier, the same anti-forgery code, and the same message digest as the message to be verified. If yes, the message to be verified is sent by the message server that corresponds to the channel for receiving the message to be verified, and verification succeeds. If no, the message to be verified fails to be verified.

The verification server adds a verification result of the message to be verified to a message verification response, and sends the message verification response to the terminal device that initiates a request. After receiving the message verification response, the terminal device displays the verification result in the response to the user.

Figure 5:
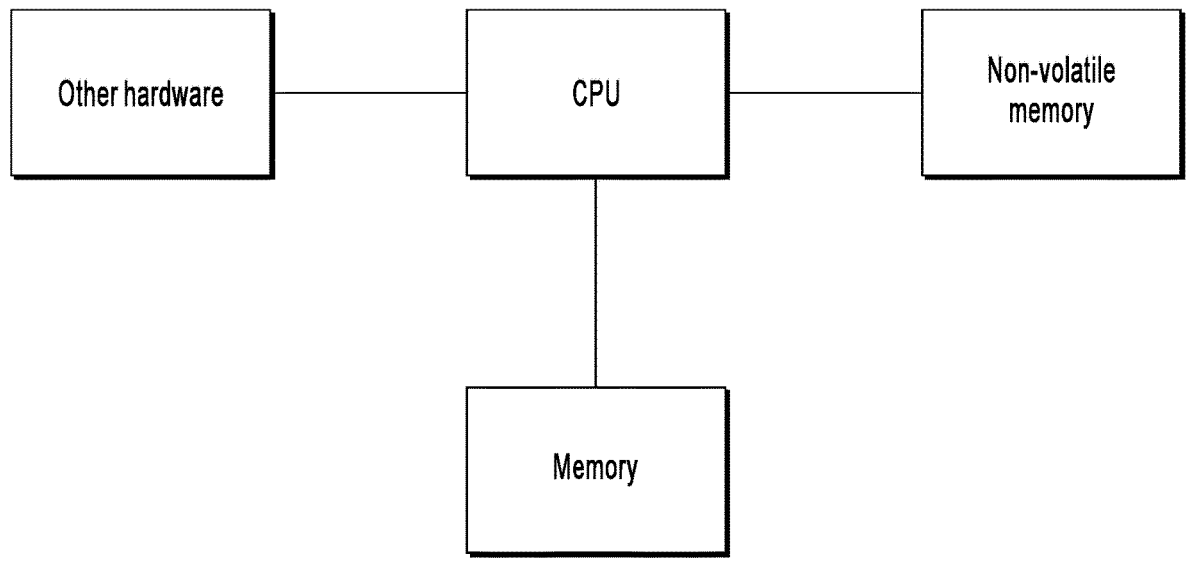
FIG. 5 is a hardware structural diagram illustrating a terminal device, a message server, or a verification server.

Corresponding to the previous procedure, an implementation of the present application further provides a message anti-forgery implementation device applied to a verification server, a message anti-forgery implementation device applied to a message server, and a message anti-forgery implementation device applied to a terminal device. The three devices each can be implemented by software, hardware, or a combination of hardware and software. Software implementation is used as an example. As a logical device, the device is formed by reading a corresponding computer program instruction to a memory by a central process unit (CPU) of the terminal device, the verification server, or the message server for running. In terms of hardware, in addition to the CPU, the memory, and the nonvolatile memory shown in FIG. 5, the terminal device including the message anti-forgery implementation device usually further includes other hardware such as a chip configured to receive or send a wireless signal, and the verification server or the message server including the message anti-forgery implementation device usually further includes other hardware such as a board card configured to implement a network communication function.

Figure 6:
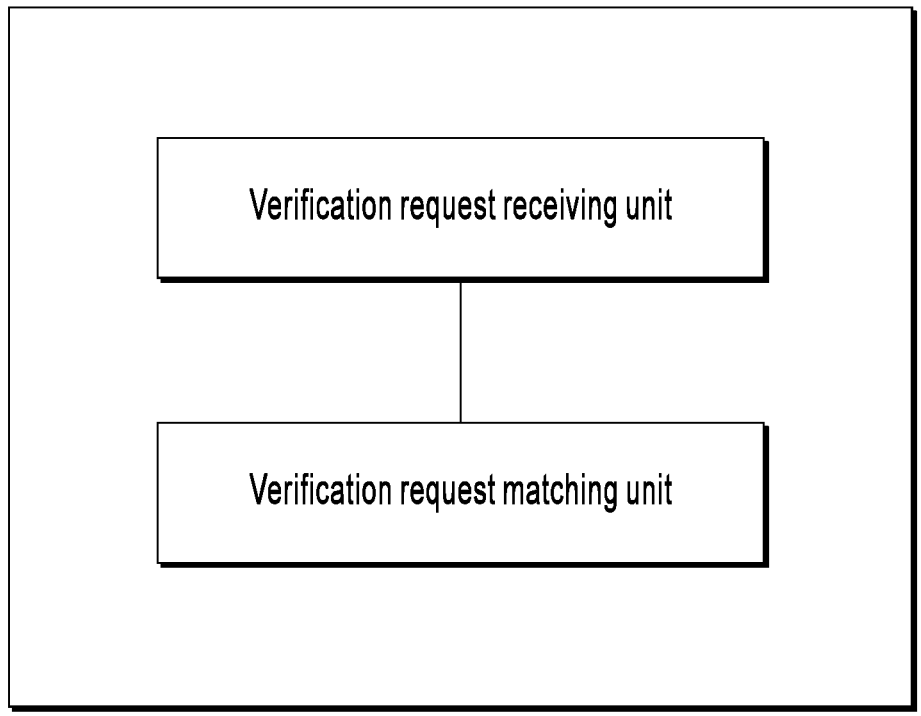
FIG. 6 is a logical structural diagram illustrating a message anti-forgery implementation device applied to a verification server, according to an implementation of the present application.

FIG. 6 shows a message anti-forgery implementation device applied to a verification server, according to an implementation of the present application. The verification server can obtain a delivery message record. The delivery message record includes receiver user identifiers and feature information of some delivery messages. The device includes a verification request receiving unit and a verification request matching unit. The verification request receiving unit is configured to receive a message verification request uploaded by a terminal device. The message verification request includes a receiver user identifier and verification information of a message to be verified. The verification request matching unit is configured to return a "verification succeeds" response to the terminal device, when the delivery message record has a delivery message that has the same receiver user identifier as the message to be verified and whose feature information matches the verification information of the message to be verified.

Optionally, the feature information of the delivery message includes an anti-forgery code of the delivery message, and the verification information of the message to be verified includes an anti-forgery code included in the message to be verified, to match the anti-forgery code of the delivery message.

Optionally, the feature information of the delivery message includes a content feature value that is generated based on message content of the delivery message by using a predetermined algorithm. The verification information of the message to be verified includes message content of the message to be verified.

For example, the device further includes a to-be-verified content feature value unit, configured to generate a content feature value of the message to be verified based on the message content of the message to be verified by using the predetermined algorithm, to match the content feature value of the delivery message.

In the previous example, the content feature value can include a content digest generated based on the message content and the receiver user identifier by using a predetermined digest algorithm.

Optionally, the message verification request includes a complete message body of the message to be verified. The device further includes a message body parsing unit, configured to parse the complete message body of the message to be verified, to obtain the verification information of the message to be verified.

Optionally, the user identifier includes a mobile device identifier of a user, an e-mail address, and/or a user name in an instant messaging system. The delivery message record further includes a delivery channel for the delivery message. The message verification request further includes a receiving channel for the message to be verified, to match the delivery channel for the delivery message.

Figure 7:
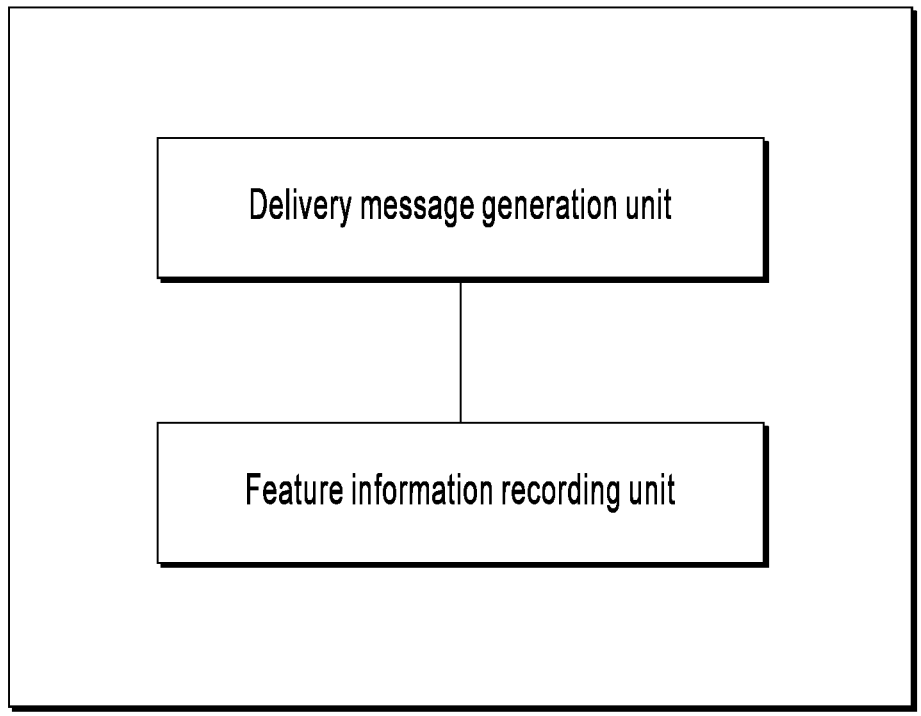
FIG. 7 is a logical structural diagram illustrating a message anti-forgery implementation device applied to a message server, according to an implementation of the present application.

FIG. 7 shows a message anti-forgery implementation device applied to a message server, according to an implementation of the present application. The device includes a delivery message generation unit and a feature information recording unit. The delivery message generation unit is configured to generate a delivery message, and send the delivery message based on a receiver user identifier. The feature information recording unit is configured to write the receiver user identifier and feature information of the delivery message into a delivery message record, so that a verification server matches the receiver user identifier and the feature information of the delivery message with a receiver user identifier and verification information of a message to be verified, to determine whether the message to be verified is verified.

Optionally, the delivery message generation unit is configured to generate an anti-forgery code of the delivery message, encapsulate the anti-forgery code in the delivery message, and send the delivery message based on the receiver user identifier. A combination of the anti-forgery code and the receiver user identifier is in a one-to-one mapping relationship with the delivery message.

For example, the feature information of the delivery message includes a content feature value that is generated based on message content of the delivery message by using a predetermined algorithm.

In the previous example, the device can further include a delivery content feature value unit, configured to generate a content digest based on the message content and the receiver user identifier of the delivery message by using a predetermined digest algorithm, and use the content digest as the content feature value of the delivery message.

Figure 8:
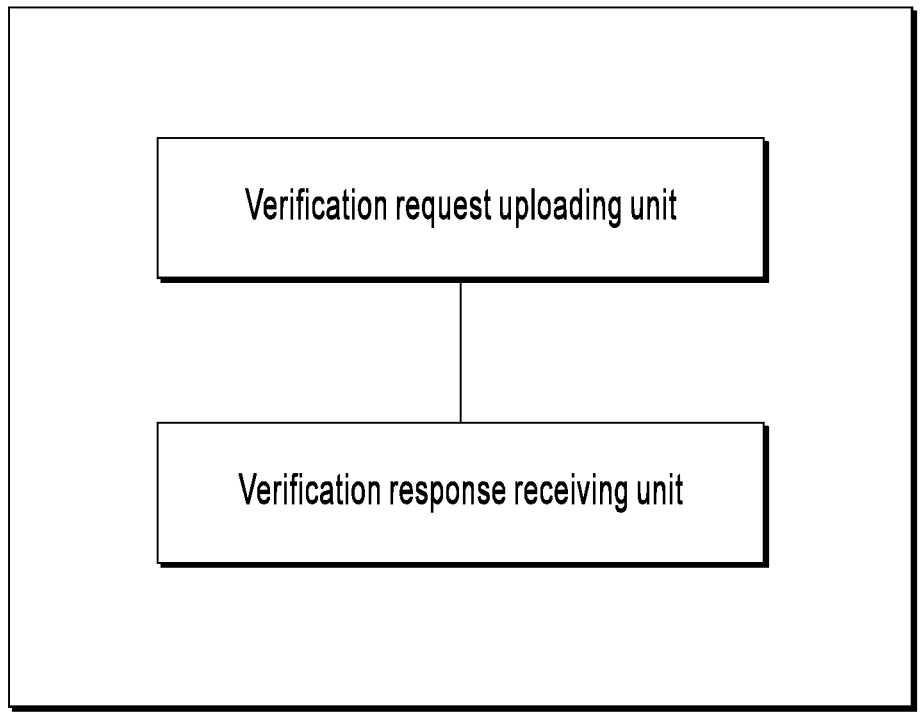
FIG. 8 is a logical structural diagram illustrating a message anti-forgery implementation device applied to a terminal device, according to an implementation of the present application.

FIG. 8 shows a message anti-forgery implementation device applied to a terminal device, according to an implementation of the present application. The device includes a verification request uploading unit and a verification response receiving unit. The verification request uploading unit is configured to upload a message verification request to a verification server based on a user operation, where the message verification request includes a receiver user identifier and verification information of a message to be verified, so that the verification server matches the receiver user identifier and the verification information of the message to be verified with a receiver user identifier and feature information of a delivery message in a delivery message record, to determine whether the message to be verified is verified. The verification response receiving unit is configured to receive a message verification response that includes a verification result and is returned by the verification server, and display the verification result to a user.

Optionally, the verification information of the message to be verified includes an anti-forgery code included in the message to be verified.

Optionally, the verification information of the message to be verified includes message content of the message to be verified.

Optionally, the device can further include a message body encapsulation unit, configured to encapsulate a complete message body of the message to be verified in the message verification request, so that the verification server parses the complete message body to obtain the verification information of the message to be verified.

Optionally, the device further includes a receiving channel unit, configured to obtain a receiving channel for the message to be verified, and encapsulate information of the receiving channel in the message verification request.

The previous descriptions are merely example implementations of the present application, but are not intended to limit the present application. Any modification, equivalent replacement, or improvement made without departing from the spirit and principle of the present application shall fall within the protection scope of the present application.

In a typical configuration, a computing device includes one or more central processing units (CPU), an input/output interface, a network interface, and a memory.

The memory can include a non-persistent memory, a random access memory (RAM), and/or a nonvolatile memory in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a phase change memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, a tape and disk storage or another magnetic storage device, or any other non-transmission media. The computer storage medium can be configured to store information that can be accessed by the computing device. As described in the present specification, the computer readable medium does not include a transitory computer readable medium (transitory media) such as a modulated data signal and a carrier.

It is worthwhile to further note that in the present specification, the terms "include", "contain", or their any other variants are intended to cover a non-exclusive inclusion, so that a process, a method, an article, or a device that includes a list of elements not only includes those elements but also includes other elements which are not expressly listed, or further includes elements inherent to such process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a magnetic disk storage, a CD-ROM, an optical memory, etc.) that include computer-usable program code.

Figure 9:
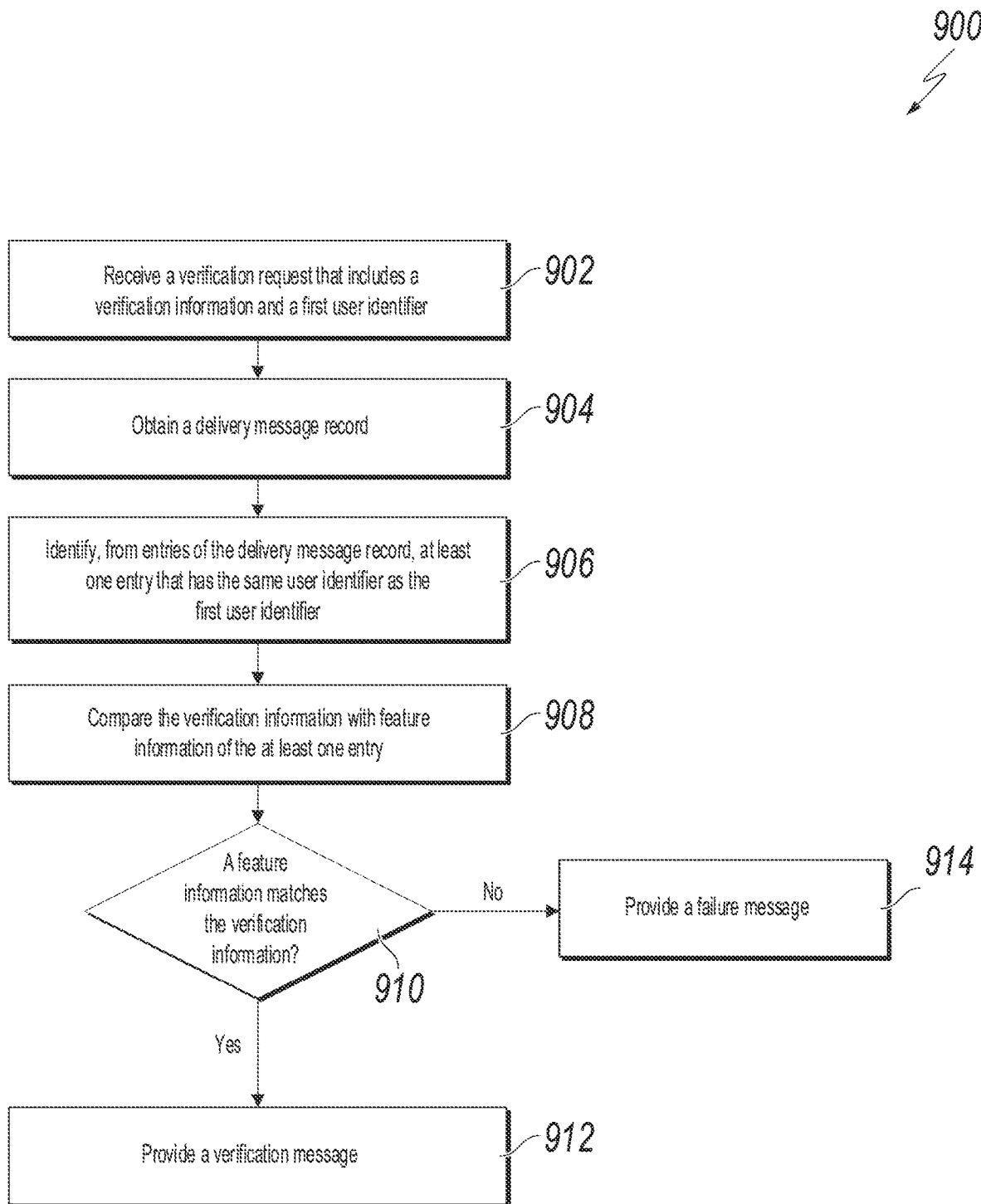
FIG. 9 is a flowchart illustrating an example of a computer-implemented method for verifying authenticity of a message, according to an implementation of the present disclosure.

FIG. 9 is a flowchart illustrating an example of a computer-implemented method 900 for verifying authenticity of a message, according to an implementation of the present disclosure. For clarity of presentation, the description that follows generally describes method 900 in the context of the other figures in this description. For example, method 900 can be performed by the verification server depicted in FIG. 1, or the message anti-forgery implementation device depicted in FIG. 6. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, a verification request is received. The verification request may be sent by a user computing device to verify authenticity of a first message received at the user computing device. The verification request includes a first user identifier and a verification information. The first user identifier can be an identification information of the user computing device, an email address, or an account username such as a user name in an instant messaging system.

The verification information can include the message content of the first message. The verification information can include an anti-forgery code associated with the first message. In some implementations, the verification information includes information of a channel through which the first message was received by the user computing device. For example, a channel may correspond to short messages, another channel may correspond to instant messages, and yet another channel may correspond to push notifications. In some implementations, the verification information includes a feature value that is determined by applying a digest algorithm on the content of the first message.

The verification information and the first user identifier can be extracted by parsing the verification request. The parsing method can be selected based on a format of the first message. In some implementations, depending on the channel through which the first message was transferred different parsing methods may be used. For example, a first parsing method may be used for messages transferred through instant message channels and a second parsing method may be used for messages transferred through short message channels. From 902, method 900 proceeds to 904.

At 904, a delivery message record is obtained. The delivery message record includes a plurality of entries associated with one or more messages. The one or more messages are messages that are sent (e.g., by the message server of FIG. 1) to one or more user computing devices. Each entry of the plurality of entries includes a user identifier and a feature information corresponding to a respective message of the one or more messages.

In some implementations, the delivery message record is obtained by accessing a delivery message record table that maps a plurality of messages to a plurality of user identifiers. The delivery message record table can be stored on a computing server such as the message server or the verification server of FIG. 1. The delivery message record table can map each message in the plurality of messages to a respective user identifier, a respective anti-forgery codes, a respective feature value, a time when the message was sent to a respective user device, and/or a channel that was used to send the message to the respective user device. From 904, method 900 proceeds to 906.

At 906, at least one entry that has the same user identifier as the first user identifier is identified. In case that user identifier of no entry in the delivery message record matches the first user identifier, method 900 proceeds to 914 and provides a failure message to the user computing device that sent the verification requested. From 906, method 900 proceeds to 908.

At 908, the verification information of the verification request is compared with the feature information of the at least one entry that is identified at 906. Depending on the content of the verification information, the comparing process can include comparing message contents, channels, anti-forgery codes, and/or feature values of the verification message and similar contents in the feature information. From 908, method 900 proceeds to 910.

At 910, a determination is made as to whether the verification message matches a feature information of the at least one entry. If it is determined that the verification message matches a feature information, method 910 proceeds to 912. Otherwise, if it is determined that the verification information does not match feature information of any entry of the at least one entry, method 900 proceeds to 914.

At 912, a verification message is provided to the user computing device that sent the verification request. The verification message indicates that information of the first message matches information of an entry of the delivery message record and authenticity of the first message is verified. The user computing device may displayed, played (e.g., as an audio or video), and/or transfer the verification message to another computing device.

At 914, a failure message is provided to the user computing device. The failure message indicates that the authenticity of the first message is not verified, as information of no entries in the delivery message record matches information of the first message. The user computing device may displayed, played (e.g., as an audio or video), and/or transfer the failure message to another computing device.

In some implementations, the anti-forgery code is included in the verification request and can be extracted by a parsing process. In some implementations, the anti-forgery code can be determined based on other contents of the verification request. For example, the anti-forgery code can be determined based on a message identifier of the first message. The message identifier can be a sequence number allocated to the first message when the first message was send to the user device (e.g., by the message server of FIG. 1). The message identifier can be used as an anti-forgery code.

Alternatively or in addition, the message identifier can be inputted to a hash algorithm to receive a hash value. The one or more digits (e.g., the last four digits) of the hash value can be assigned as the anti-forgery code of the first message. In some implementations, the hash value is generated by applying the hash algorithm on a combination of the message identifier and a time value. The time value can represent a time when the first message was sent to the user computing device. The message identifier and the time value can be determined by parsing the verification information.

Each entries in the delivery message record can be associated with a respective anti-forgery code that is generated by using the same method used for generating the anti-forgery code of the first message. Using the same method for generating anti-forgery codes allows comparing the anti-forgery of the first message to the anti-forgery codes of entries of the delivery message record, for example, as part of the comparing process in 908 and 910. In case that the anti-forgery code of the first message does not match the anti-forgery code of an entry, the first messages does not match the message associated with the entry.

Security is a critical issue in communications over computer networks. It may be hard to distinguish fake messages from legit messages, as fake messages may look very much like legit messages. However, distinguishing fake messages from legit ones can be very critical in protecting user information. For example, a fake message that uses the exact format, title, signatures, etc. of a bank message may ask for a payment or account information of a user. If the fake message is not recognized, the user may react to the message and unintentionally provide sensitive information to a fraudulent entity.

Implementations of the present disclosure improve network security. According to the implementations, a user that suspects authenticity of a message can send a verification request to a verification server to verify the authenticity of the message. The verification server compares the information in the message to a record of messages sent from the same sender, to determine whether there is a record of such communication from the sender to the user. In the example bank message above, the verification server compares the message to a record of messages that were sent from the bank server to bank users. If the verification server finds a match, the verification message sends a message to the user device indicating that the message is authentic. Otherwise, if the verification message does not find a match, the verification message sends a failure message to the user device indicating that the verification failed and the message is not authentic. Accordingly, users can avoid reacting to fake messages and sharing their information with fraudulent entities.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method executed by one or more computers, the method comprising:
   receiving, by the one or more computers, one or more messages sent to one or more user computing devices;
   for each message :of the one or more messages:
      hashing, by the one or more computers, an identifier of the respective message and a time stamp to generate a numerical sequence;
      extracting, by the one or more computers, a final portion of the numerical sequence to generate an anti-forgery code of the respective message, wherein the anti-forgery code of the respective message comprises the final portion of the numerical sequence and the time stamp;
      generating, by the one or more computers, a respective entry comprising a user identifier and feature information of the respective message, wherein the feature information comprises a message content feature value of the respective message and the anti-forgery code;
   receiving, by the one or more computers and from a user computing device, a verification request to verify authenticity of a first message received by the user computing device, the verification request comprising a first user identifier and verification information;
   retrieving, by the one or more computers, a delivery message record comprising a plurality of entries associated with the one or more messages sent to the one or more user computing devices;
   identifying, by the one or more computers, at least one entry of the plurality of entries that has a second user identifier that matches the first user identifier, and in response
      determining, by the one or more computers, that the feature information of the at least one entry matches the verification information from the verification request by processing both the message content of the first message and the anti-forgery code of the first message; and
      in response to determining that the feature information matches the verification information, providing, by the one or more computers, a verification message to the user computing device, the verification message indicating that authenticity of the first message is verified.

2. The computer-implemented method of claim 1, further comprising:
   determining an anti-forgery code of the first message based on a message identifier of the first message,
   wherein determining that the feature information matches the verification information includes comparing the anti-forgery code of the first message to a respective anti-forgery of an entry of the at least one entry.

3. The computer-implemented method of claim 2, wherein determining the anti-forgery code of the first message comprises:
   determining the message identifier and a time value by parsing the verification information, the time value representing a time when the first message was sent to the user computing device;
   determining a hash value by applying a hash algorithm on the message identifier and the time value; and
   assigning one or more digits of the hash value as the anti-forgery code of the first message.

4. The computer-implemented method of claim 1, wherein the delivery message record is obtained by accessing a delivery message record table that maps a plurality of messages to a plurality of user identifiers, a plurality of anti-forgery codes, and a plurality of feature values determined based on applying a digest algorithm on message content of the first message.

5. The computer-implemented method of claim 1, wherein the verification information includes at least one of a message content of the first message, information of a channel through which the first message was received by the user computing device, and a feature value that is determined by applying a digest algorithm on the message content.

6. The computer-implemented method of claim 1, wherein the first user identifier includes at least one of an identifier of the user computing device, an e-mail address, and a user name in an instant messaging system.

7. The computer-implemented method of claim 1, further comprising parsing the verification request based on a parsing method to extract the first user identifier and the verification information.

8. The computer-implemented method of claim 7, wherein the parsing method used for parsing the verification request depends on a channel through which the first message was transferred to the user computing device.

9. A non-transitory, computer-readable medium storing one or more instructions executable by a computer system to perform operations comprising:
   receiving one or more messages sent to one or more user computing devices;
   for each message of the one or more messages:
      hashing an identifier of the respective message and a time stamp to generate a numerical sequence;
      extracting a final portion of the numerical sequence to generate an anti-forgery code of the respective message, wherein the anti-forgery code of the respective message comprises the final portion of the numerical sequence and the time stamp;
      generating a respective entry comprising a user identifier and feature information of the respective message, wherein the feature information comprises a message content feature value of the respective message and the anti-forgery code;
   receiving, from a user computing device, a verification request to verify authenticity of a first message received by the user computing device, the verification request comprising a first user identifier and verification information;

retrieving a delivery message record comprising a plurality of entries associated with the one or more messages sent to the one or more user computing devices;

identifying at least one entry of the plurality of entries that has a second user identifier that matches the first user identifier, and in response: determining that the feature information of the identified at least one entry matches the verification information from the verification request by processing both the message content of the first message and the anti-forgery code of the first message; and in response to determining that the feature information matches the verification information, providing a verification message to the user computing device, the verification message indicating that authenticity of the first message is verified.

10. The non-transitory, computer-readable medium of claim 9, further comprising:

determining an anti-forgery code of the first message based on a message identifier of the first message, wherein determining that the feature information matches the verification information includes comparing the anti-forgery code of the first message to a respective anti-forgery of an entry of the at least one entry.

11. The non-transitory, computer-readable medium of claim 10, wherein determining the anti-forgery code of the first message comprises:

determining the message identifier and a time value by parsing the verification information, the time value representing a time when the first message was sent to the user computing device;

determining a hash value by applying a hash algorithm on the message identifier and the time value; and assigning one or more digits of the hash value as the anti-forgery code of the first message.

12. The non-transitory, computer-readable medium of claim 9, wherein the delivery message record is obtained by accessing a delivery message record table that maps a plurality of messages to a plurality of user identifiers, a plurality of anti-forgery codes, and a plurality of feature values determined based on applying a digest algorithm on message content of the first message.

13. The non-transitory, computer-readable medium of claim 9, wherein the verification information includes at least one of a message content of the first message, information of a channel through which the first message was received by the user computing device, and a feature value that is determined by applying a digest algorithm on the message content.

14. The non-transitory, computer-readable medium of claim 9, wherein the first user identifier includes at least one of an identifier of the user computing device, an e-mail address, and a user name in an instant messaging system.

15. The non-transitory, computer-readable medium of claim 9, further comprising parsing the verification request based on a parsing method to extract the first user identifier and the verification information.

16. The non-transitory, computer-readable medium of claim 15, wherein the parsing method used for parsing the verification request depends on a channel through which the first message was transferred to the user computing device.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving one or more messages sent to one or more user computing devices;

for each message of the one or more messages:
hashing an identifier of the respective message and a time stamp to generate a numerical sequence;

extracting a final portion of the numerical sequence to generate an anti-forgery code of the respective message, wherein the anti-forgery code of the respective message comprises the final portion of the numerical sequence and the time stamp;

generating a respective entry comprising a user identifier and feature information of the respective message, wherein the feature information comprises a message content feature value of the respective message and the anti-forgery code;

receiving, from a user computing device, a verification request to verify authenticity of a first message received by the user computing device, the verification request comprising a first user identifier and verification information;

retrieving a delivery message record comprising a plurality of entries associated with the one or more messages sent to the one or more user computing devices;

identifying at least one entry of the plurality of entries that has a second user identifier that matches the first user identifier, and in response: determining that the feature information of the identified at least one entry matches the verification information from the verification request by processing both the message content of the first message and the anti-forgery code of the first message; and in response to determining that the feature information matches the verification information, providing a verification message to the user computing device, the verification message indicating that authenticity of the first message is verified.

18. The computer-implemented system of claim 17, further comprising:

determining an anti-forgery code of the first message based on a message identifier of the first message, wherein determining that the feature information matches the verification information includes comparing the anti-forgery code of the first message to a respective anti-forgery of an entry of the at least one entry.

19. The computer-implemented system of claim 18, wherein determining the anti-forgery code of the first message comprises:

determining the message identifier and a time value by parsing the verification information, the time value representing a time when the first message was sent to the user computing device;

determining a hash value by applying a hash algorithm on the message identifier and the time value; and assigning one or more digits of the hash value as the anti-forgery code of the first message.

20. The computer-implemented system of claim 17, further comprising parsing the verification request based on a parsing method to extract the first user identifier and the verification information, wherein the parsing method depends on a channel through which the first message was transferred to the user computing device.

* * * * *